United States Patent [19]
Herrod

[11] Patent Number: 5,384,903
[45] Date of Patent: Jan. 24, 1995

[54] GRAPHICS PROCESSING METHOD AND APPARATUS

[75] Inventor: John A. Herrod, Eastleigh, United Kingdom

[73] Assignee: International Business Machines Corporation, Armonk, N.Y.

[21] Appl. No.: 908,133

[22] Filed: Jul. 2, 1992

[30] Foreign Application Priority Data

Jul. 5, 1991 [EP] European Pat. Off. ............ 91306143

[51] Int. Cl.⁶ ............................................. G06F 15/72
[52] U.S. Cl. ................................................. 395/134
[58] Field of Search ............... 395/134, 133, 140, 155, 395/161; 340/706, 709, 724; 345/118, 119, 120

[56] References Cited

U.S. PATENT DOCUMENTS

| | | | |
|---|---|---|---|
| 4,698,779 | 10/1987 | Holden et al. | 364/520 |
| 5,179,645 | 1/1993 | Tanimori | 395/141 |
| 5,231,696 | 7/1993 | Roux et al. | 395/134 |

FOREIGN PATENT DOCUMENTS 0416421  8/1990  European Pat. Off.

OTHER PUBLICATIONS

"Clipping to the Boundary of a Circular-Arc Polygon", Christopher J. Van Wyk, *Computer Vision, Graphics, and Image Processing*, vol. 25, No. 3, Mar. 1984.

"Method of Correlating on Areas in an Interactive Display System", *IBM Technical Disclosure Bulletin*, vol. 29, No. 5, Oct. 1986, pp. 1953-1954.

"Fundamentals of Interactive Computer Graphics", by J. D. Foley and A. Van Dam, pp. 450-457, published 1982 by Addison Wesley.

*Primary Examiner*—Phu K. Nguyen
*Attorney, Agent, or Firm*—Paul S. Drake

[57] ABSTRACT

When clipping a graphics element defined by its element border to a viewing window having a window border within which the graphics element is to be displayed, it is necessary to plot closure lines along the window border between the points where the element border exits and enters the viewing window. This closure line may be plotted along one of two paths between the points and along the window border. The system detects which of these paths the closure line should take. An effectively infinitely extending line from a point on the window border is tested to see whether it crosses that portion of the element border outside the viewing window between the exit point and the entry point an odd or an even number of times. If it crosses an odd number of times then the closure line is plotted to pass through the predetermined point, and if it crosses an even number of times then the closure line is plotted to not pass through the predetermined point.

15 Claims, 5 Drawing Sheets

GRAPHICS PROCESSING METHOD AND APPARATUS

TECHNICAL FIELD

This invention relates to the field of graphics processing methods and apparatus. More particularly, this invention relates to the clipping of graphics elements comprising areas defined by the border enclosing the area in such graphics processing apparatus.

BACKGROUND ART

The need for graphics clipping arises in most systems that display graphics. An example of such a system is the IBM Graphical Data Display Manager (GDDM) program produced by IBM Corporation (GDDM and IBM are trademarks of International Business Machines Corporation). The GDDM program runs on a system comprising a host computer to which many terminals are attached. The host computer stores and processes graphics and then sends it to the appropriate terminal for display. These operations of the system are performed under the control of the GDDM program. One of the functions a program such as the GDDM program must perform is graphics clipping.

There are a number of known ways of clipping graphics areas defined by their border to so called viewing windows or viewports, e.g. Sutherland-Hodgman Algorithm, Weiler-Atherton Algorithm. A discussion of these techniques can be found in the book 'Fundamentals of Interactive Computer Graphics' by J. D. Foley and A. Van Dam, pages 450 to 457 published in 1982 by Addison Wesley.

The Sutherland-Hodgman Algorithm works on the principle of treating the viewing window as being composed of a collection of infinitely extending clip lines. The task of clipping a subject polygon against a single infinitely extending clip line is relatively straight forward. By collecting the results of successive clippings against these clip lines the portion of the polygon to be displayed may be determined. A particular problem that occurs concerns detecting how to plot the so called 'closure lines' between points on the boundary of the polygon being clipped where it intersects the viewing window. The standard Sutherland-Hodgman produces extraneous closure lines that must be removed by additional processing steps. The need for this extra processing to eliminate the extraneous edges reduces the efficiency of the clipping.

An alternative is to use the Weiler-Atherton Algorithm. This algorithm operates by tracking around the border of the subject polygon in the clockwise direction until an intersection with the viewing window is encountered. If the edge is entering the viewing window, the algorithm then proceeds along the subject polygon edge. If the edge is leaving the viewing window, then the algorithm makes a right turn and follows the edge of the viewing window. In either case, the intersection is remembered and used to ensure that all paths are tracked exactly once. While the Weiler-Atherton Algorithm does not suffer from the problem of producing extraneous closure lines it is disadvantageously more complex than the Sutherland-Hodgman Algorithm.

SUMMARY OF THE INVENTION

This invention is concerned with the technical problem which occurs in graphics processing apparatus of ensuring, an appropriate closure line is plotted along the edge of a viewing window between two points at which the border of the area to be displayed intersects the viewing window without introducing disadvantageous complexity.

Viewed from one aspect the invention provides a method of clipping a graphics element having an element border to a viewing window having a window border in a graphics processing system comprising, tracking around said element border to detect an exit point (EX) at which exit point said element border intersects said window border and exits said viewing window, and tracking around said element border to detect an entry point (EN) at which entry point said element border intersects said window border and enters said viewing window, characterised by detecting if a notional line starting at and extending an effectively infinite distance from a predetermined point (P) on said window border crosses that portion of said element border outside said viewing window between said exit point and said entry point an odd number of times or an even number of times, and either if said notional line crosses said portion an odd number of times, plotting a closure line along said window border between said exit point and said entry point and passing through said predetermined point on said window border, or if said notional line crosses said portion an even number of times, plotting a closure line along said window border between said exit point and said entry point and not passing through said predetermined point.

The invention provides a way in which the correct closure line can be produced once the exit and entry points have been detected. A version of the Sutherland-Hodgman Algorithm for detecting the exit and entry points could be used and the invention then employed to detect which way to plot the closure line along the window border. Such a clipping process would not suffer from the disadvantage of the normal Sutherland-Hodgman Algorithm of producing erroneous closure lines which must be removed by subsequent additional process steps. In addition, such a clipping process does not suffer from the disadvantageous complexity that is introduced if the Weiler-Atherton algorithm is used. None of the prior art clipping techniques test a predetermined point on the window border to detect how to plot the closure line.

It will be appreciated that the viewing window and graphics elements can have many shapes and the invention is not limited in its application to any particular shapes such as rectangular viewing windows and polygonal graphics elements. The idea of an effectively infinite distance requires explanation. What is required is that the notional line should extend a distance sufficient to be sure that the far end of the line will lie outside and graphics element to be clipped, and it will be appreciated that the notional line need not necessarily extend to infinity in the strict mathematical sense to achieve this.

It will also be appreciated that the total number of crossings could be counted and then tested to see if it was odd or even, but it is equally possible that a single flag could be set or reset at each crossing thereby recording only the parity of the number of crossings. Similarly it will be appreciated that said effectively infinitely extending line could be straight, curved or looped in any way but advantageously simple embodiments would use a straight line.

A further preferred feature is that said odd number of times or even number of times is detected by tracking around said predetermined portion. This has the advantage that when you have tracked around the complete predetermined portion you can be sure that you have encountered every crossing. The alternative would be to track along the effectively infinitely extending line, but in doing this you could never be sure that all the crossings had been encountered until you reached the end of the line; this would take a disadvantageously long time and you could pick up crossings not between the entry and exit point currently under consideration.

In most cases the viewing window will be rectangular and in such instances it is desirable that said predetermined point is at a vertex in said window border and said line is an extension of a portion of said window border forming said vertex. This feature is desirable since in order to detect the exit point and entry point the system will already be clipping against effectively infinitely extending lines making up the edges of the window as discussed in relation to the Sutherland-Hodgman Algorithm. Accordingly the test for detecting whether the predetermined point is inside or outside the window border may be implemented with a minimum of additional code.

So far no mention has been made of the difficulties that arise when special geometrical conditions occur such as the predetermined point being coincident with the exit or entry point, or the effectively infinitely extending line touching but not crossing the predetermined portion. It would be possible to rely on such occurrences being infrequent and accepting that erroneous closure lines may occasionally be produced, but preferred embodiments of the invention include a mechanism for dealing with these exceptional conditions. One way of dealing with these problems is to arrange that said predetermined portion is detected to have crossed said line if said predetermined portion leads towards and then touches said line or touches and then leads away from said line on a first side of said line and said predetermined portion leading towards and then touching or touching and then leading away form said line on a second side of the line is detected not to have crossed said line. Clearly either side of the infinitely extending line can be designated the first or second side.

An example of this is if the predetermined portion approaches the effectively infinitely extending line from the second side, touches it, and then leaves on the second side, that will not count as a crossing. Conversely, if the element border approaches the effectively infinitely extending line from the first side, touches it, and then leaves on the first side, that will count as two crossing. If the element border is either entering or leaving the viewing window through the predetermined point then whether the element border crosses the effectively infinitely extending line is detected by whether the predetermined portion outside the viewing window which moves away from the effectively infinitely extending line does so on the first side or the second side, If it moves away on the first side then that is detected as a crossing and if it moves away on the second side then that is not detected as a crossing.

A similar problem arises when the predetermined point lies on the exit point or entry point, and the test for detecting whether the closure line joining the exit and entry points passes through the predetermined point is closely analogous. If the closure line extends away from the predetermined point on the first side of the effectively infinitely extending line then that is detected as having passed through the predetermined point. Conversely, if the closure line extends away from the predetermined point on the second side of the line then that is detected as not having passed through the predetermined point.

Another preferred feature of the invention which avoids the need for repeating tests already made is that if said tracking starts at a point outside said viewing window then the first entry point is paired with the last exit point, and the number of crossing of said line between said start point and said entry point is stored and added to the number of crossings of said line between said last exit point and said start point.

Viewed from a second aspect the invention provides a graphics processing apparatus having a display for displaying graphics elements and clipping logic for clipping a graphics element having an element border to a viewing window having a window border, said clipping logic including means for tracking around said element border to detect an exit point at which exit point said element border intersects said window border and exits said viewing window, and means for tracking around said element border to detect an entry point at which entry point said element border intersects said window border and enters said viewing window, characterised by means for detecting if a notional line starting at and extending an effectively infinite distance from a predetermined point on said window border crosses that portion of said element border outside said viewing window between said exit point and said entry point an odd number of times or an even number of times, and either if said notional line crosses said portion an odd number of times, plotting a closure line along said window border between said exit point and said entry point and passing through said predetermined point on said window border, or if said notional line crosses said portion an even number of times, plotting a closure line along said window border between said exit point and said entry point and not passing through said predetermined point.

BRIEF DESCRIPTION OF THE DRAWING

An embodiment of the invention will now be described, by way of example only, with reference to the accompanying drawings in which.

DETAILED DESCRIPTION OF THE PREFERRED EMBODIMENTS

Figure 1A:
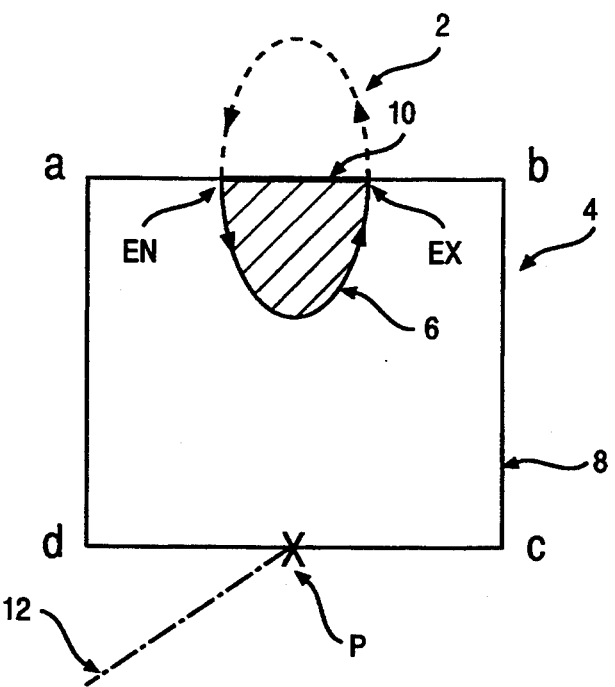
FIG. 1 illustrates the operation of an embodiment of the invention.
Figure 1B:
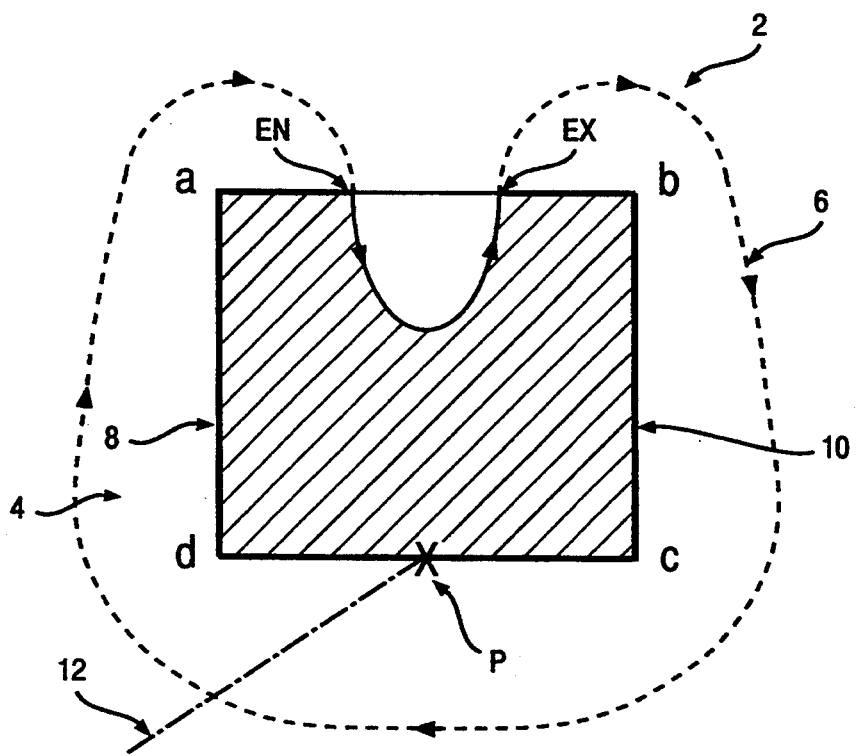

In FIG. 1 there is a graphics element 2 and a viewing window 4. The graphics element 2 has an element border 6. The viewing window 4 has a window border 8.

The portion of the element border 6 that is within the viewing window 4 is the same in both Case A and Case B. Starting at a point on the element border 6 that is within the viewing window 4 and tracking around the element border 6 the system first detects an exit point EX where the element border 6 intersect the window border 8 and leaves the viewing window 4. Further tracking around the element border 6 the system detects an entry point EN where the element border 6 intersects the window border 8 and enters the viewing window 4.

The portion of the element border 6 within the viewing window 4 and the position of the exit point EX and the entry point EN is the same in both cases. The system must somehow determine where to draw the closure line 10. The closure line 10 could be plotted along the window border 8 directly from point EX to point EN or it could be plotted along the window border 8 from point EX to point EN through the corners b, c, d and a. As can be seen from inspection of Case A the correct path is directly from point EX to point EN, whereas in Case B the correct path is through corners b, c, d and a.

In order to distinguish between these two cases the system tests to see how many times the effectively infinitely extending notional line 12 crosses the portion of the element border 6 outside the viewing window 4 between the exit point EX and the entry point EN. In Case A the test shows zero crossings (even) indicating the closure line should not pass through point P, i.e. the closure line 10 is plotted along the window border 8 directly from point EX to point EN. In Case B the test shows one crossing (odd) indicating that the closure line 10 should pass through point P, i.e. the closure line 10 is plotted along the window border 8 from point EX to point EN via corners b and c, point P, and corners d and a.

Once the correct closure line 10 has been plotted, the bounded area within the viewing window 4 will have been defined and this can be subject to the standard area fill techniques to shade in the portion of the graphics element 2 that is visible within the viewing window 4. It will be appreciated that the closure line 10 shown in FIG. 1 has an exaggerated thickness and in practice the closure line 10 may be plotted to have any thickness. In some cases the closure line 10 may have zero thickness and will merely serve as a boundary for the area fill technique to work to.

The element border 6 is defined as a list of instructions/vectors, e.g. start area, vector 1, vector 2, . . . , end area. The vectors can be in the form of start and end coordinates, curves represented by start point, end point and curvature or any other convenient representation. Tracking along the element border 6 involves working down the list of vectors and for each vector determining if the line it defines intersects the window boundary. The sequential reading of the vectors, their clipping against the viewing window 4, and their display in clipped form is known in the prior art, e.g. the GDDM program. The additional processing steps for determining the correct closure line 10 are added to the known clipping process. When the correct closure line has been determined it is added to the line of clipped vectors to be sent from the host processor to the display device.

Figure 2:
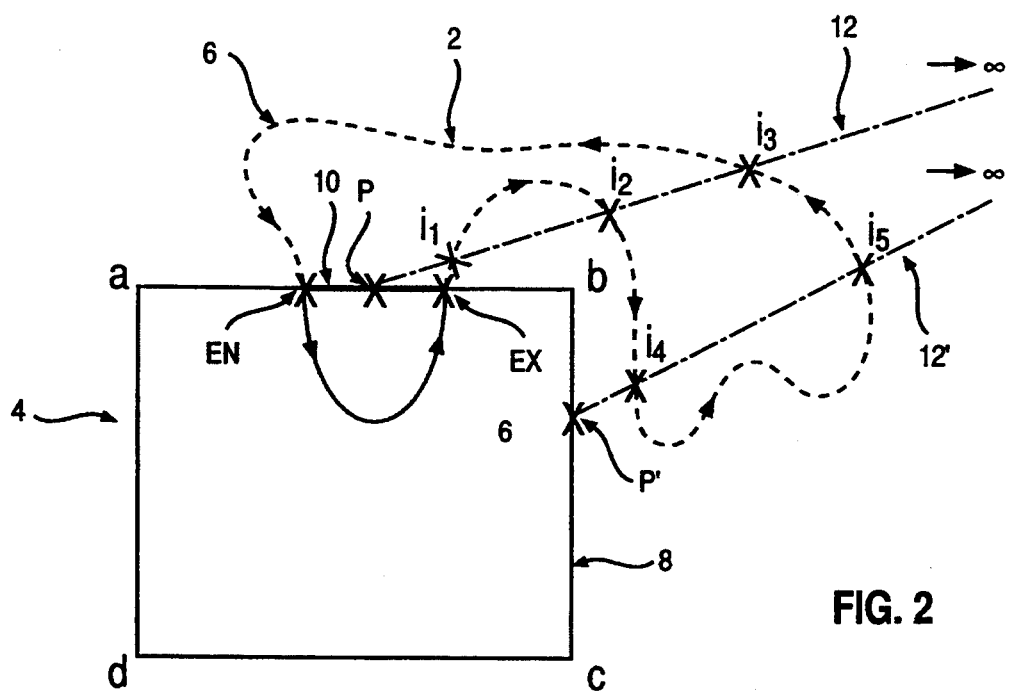
FIG. 2 illustrates the operation of the invention with a more complexly shaped graphics element than in FIG. 1.

FIG. 2 illustrates the operation of the invention with a more complexly shaped graphics element 2. The test is for the system to track around the portion of the element border 6 outside of the viewing window 4 between the exit point EX and the entry point EN to detect the number of crossings of that portion of the element border 6 with a notional line 12 effectively infinitely extending away from point P.

Considering point P and line 12 as illustrated there are three intersections at i1, i2 and i3. This odd number of crossing indicates that the closure line 10 should pass through point P. As can be see this is the appropriate result for that predetermined point P. There is also illustrated a point P' and a line 12'. There are two intersections of line 12' at i4 and i5. This indicates that the closure line 10 should not pass through point P'. Again this can be seen to be the appropriate result for point P'.

Figure 3:
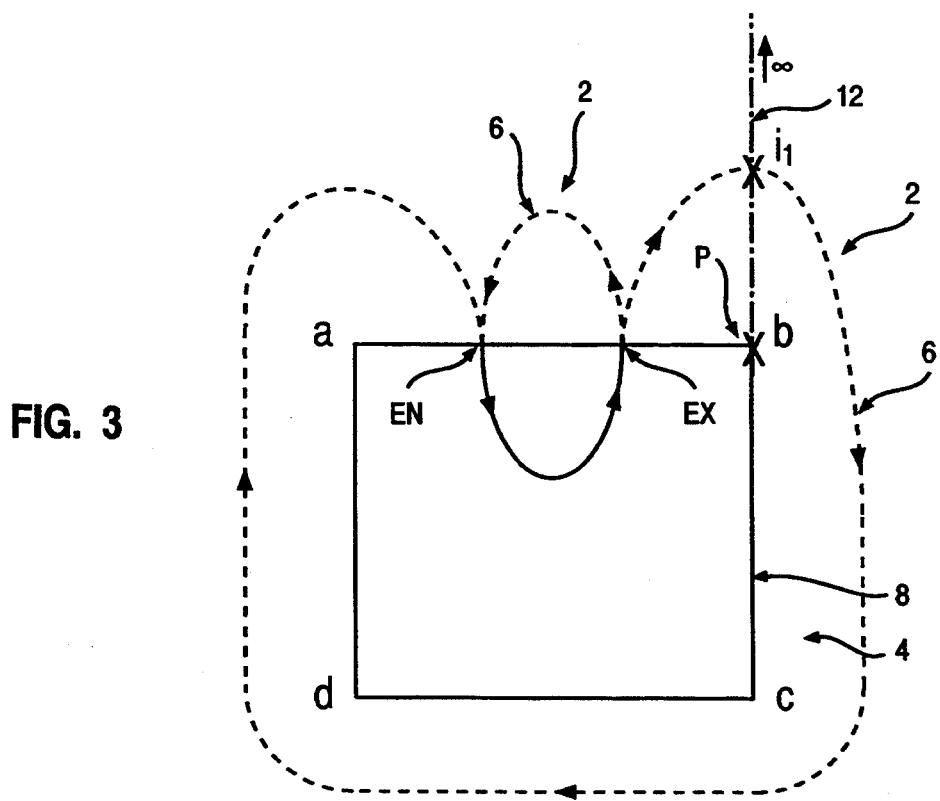
FIG. 3 illustrates the use of an effectively infinitely extending line which is an extension of an edge of the viewing window.

FIG. 3 illustrates a preferred form of the test illustrated in FIG. 2. The effectively infinitely extending line 12 is a continuation of one of the edges of the viewing window 4. The point P is coincident with corner b. This arrangement is preferred since in detecting the exit point and entry point in accordance with the known methods the crossings of the element border 6 and an infinitely extending line including the edge of the viewing window will already have been detected. In the case of the element border 6 giving rise to the intersection i1 the closure line will pass through point P, whereas for the element border 6 giving rise to no intersections the closure line will not pass through point P.

Figure 4:
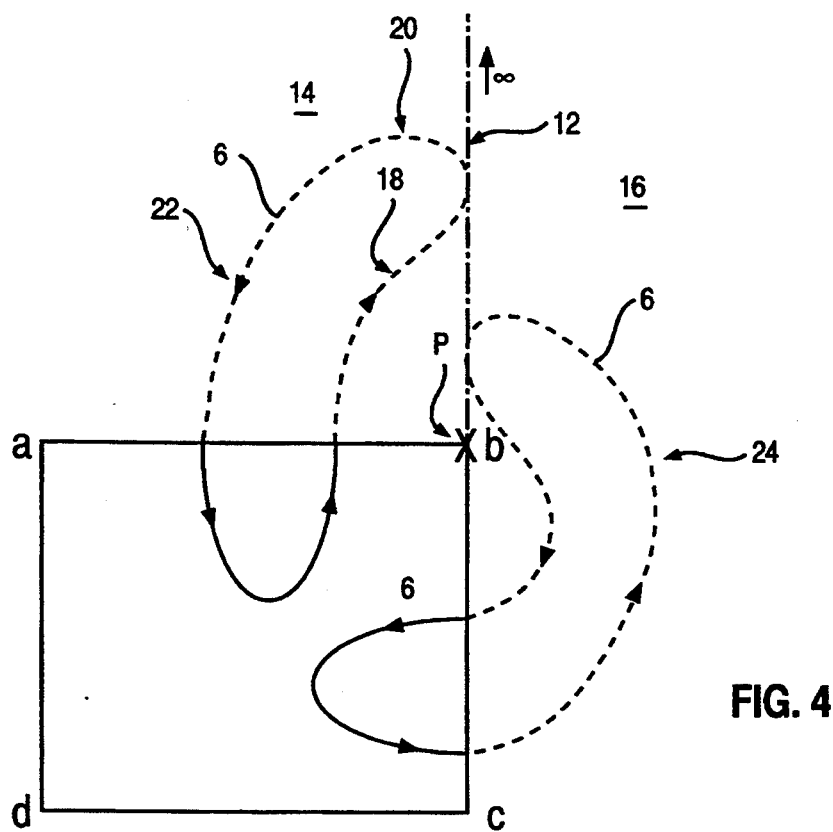
FIG. 4 illustrates the situation in which the element border touches but does not cross the effectively infinitely extending line.

FIG. 4 illustrates how the system deals with element borders 6 that touch but do not cross the line 12. A portion of the element border 6 either coming towards and then touching or touching and then leaving the line 12 on a first side 14 of the line 12 is deemed to cross the line. Accordingly, the graphics element 22 is deemed to cross the line 12 twice. The portion 18 of the element border 6 which comes towards and then touches the line 12 counts as a crossing and the portion 20 of the element border 6 which touches and then leaves the line 12 counts as crossing.

Conversely, a portion of the element border 6 either coming towards and then touching or touching and then leaving the line 12 on a second side 16 of the line 12 is deemed not to cross the line 12. Accordingly, the graphics element 24 is deemed not to cross the line 12.

Figure 5:
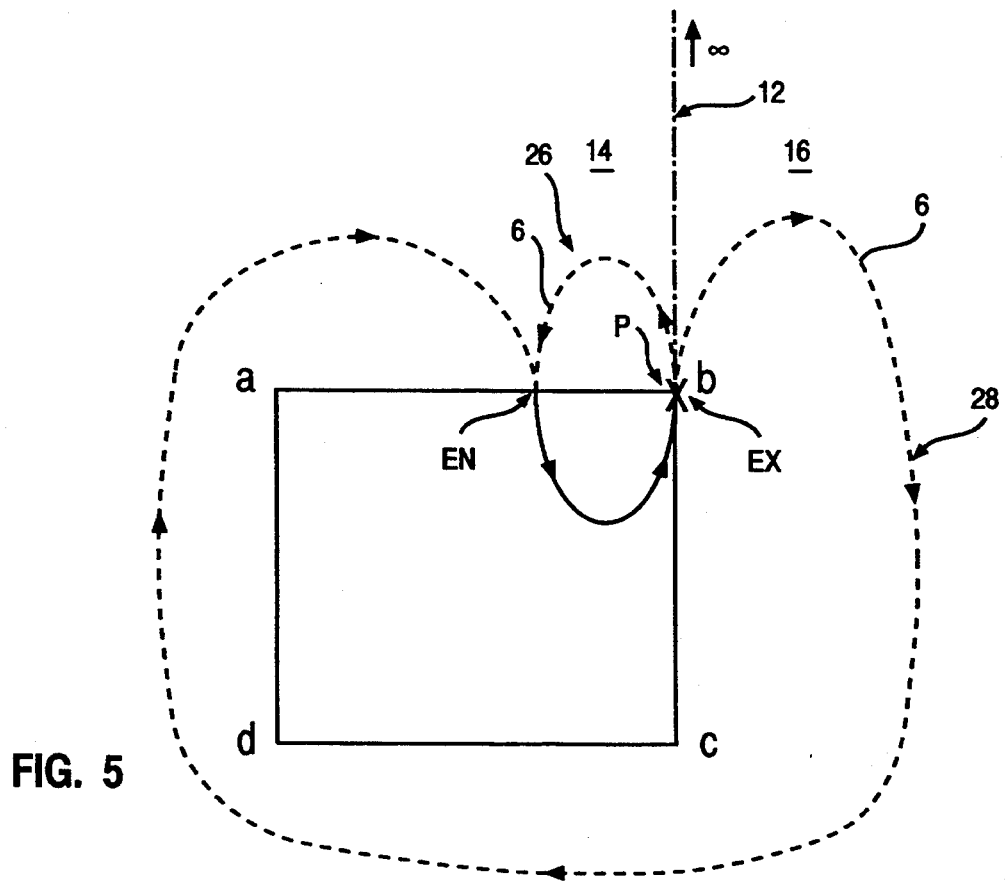
FIG. 5 illustrates the situation in which the entry point or exit point is coincident with the predetermined point.

FIG. 5 illustrates how the system deals with the situation in which the predetermined point P is coincident with either the exit point EX or the entry point EN. The point P is deemed to be part of the line 12 and the rule as to whether the line 12 is crossed by the element border 6 is the same as above. The rule for detecting whether the closure line 10 passes through the point P must be made consistent with the rule for whether the element border 10 crosses the line 12. A closure line 10 with an end coincident with the point P is deemed to pass through the point P if the closure line 10 has a portion leading to or away from point P on the first side 14 of the line 12. A portion leading to or away from the point P on the second side 16 does not count as passing through the point P.

Accordingly, in FIG. 5 the graphics element 26 has an element border 6 which is deemed to cross the line 12 once as it has a portion of element border 6 which touches and then leaves the line 12 on the first side 14. In the illustrated case the test for detecting whether point P is inside the graphics element 26 detects that the point P is inside graphics element 26 and the closure line 10 should pass through point P. The closure line 10 drawn directly from point EX to point EN would be deemed to pass through the point P since a portion of the closure line 10 leads from the point P on the first side 14. The correct closure line 10 is therefore produced.

Conversely, the graphics element 28 has an element border 6 which is deemed not to cross the line 12 since the portion of the element border 6 which touches the line 12 and then leaves on the second side 16 is deemed not to cross. With zero (even number) crossings the point P is detected to be outside the graphics element 28 and a closure 10 line not passing through point P should be drawn. A closure line 10 passing from point EX to point EN via corners b, c, d, and a is deemed not to pass through point P since the portion leaving point P does so on the second side 16. Again the correct closure line 10 is produced.

Figure 6:
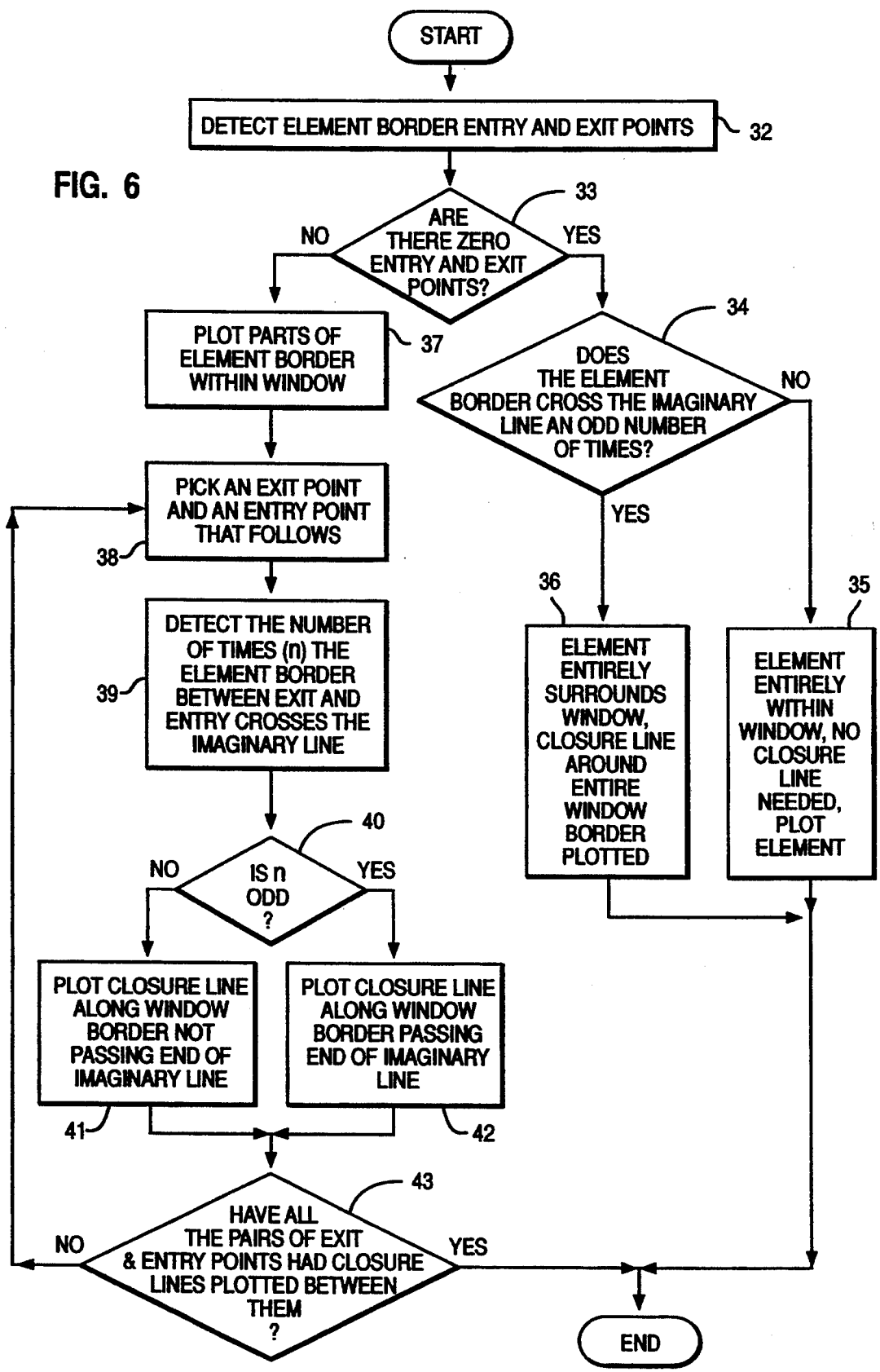
FIG. 6 is a schematic flow diagram illustrating an embodiment of the invention.

FIG. 6 is a schematic flow diagram illustrating how one embodiment of the invention may operate. Step 32 detects the points where the element border exits and enters the viewing window. Step 33 tests to see if there are zero such crossings. If this is the case it means that the graphics element is either entirely within the viewing window or the viewing window is entirely within the graphics element. These two cases are distinguished by step 34, which counts the number of times the imaginary line is crossed. This will either be zero, two, four, ... (even: graphics element within viewing window) or one, three, five, ... (odd: viewing window within graphics element). If even, then no closure line is needed and the graphics element is plotted within the viewing window (step 35). If odd, then a closure line is plotted along the entire window border (step 36).

If at step 33, entry and exit points were detected then at step 37, those portions of the element border within the window are plotted. At step 38 an exit point and entry point that directly follows it are identified. This is done by tracking a round the element border from start point on the border, which may be inside or outside the element border. If the start point is inside the viewing window, then first an exit point and a corresponding entry point will be detected. Step 39 will detect the number of crossings and steps 40 and 41 or 42 will ensure the correct closure line will be drawn. However, if the start point is outside the viewing window, then the first crossing of the window border will be an entry point. The corresponding exit point (for closure line purposes) will be the last exit point reached before the closure line is returned to. In order to avoid unnecessary repetition, the number of crossing of the imaginary line between the start point and first entry point is detected, stored and then added to the number of crossings between the last exit point and the return to the start point. The test for the direction of the closure line is then made in the same way as before. Finally, at step 43 at test to see if all the closure lines have been drawn, and if not then the process returns to step 38.

It will be appreciated that the invention will typically be implemented as a part of a computer program such as the aforementioned GDDM program. This software implementation of the invention could be in any computer language. Alternatively it would be possible for implement the invention in special purpose hardware. Another alternative apparent to those skilled in the art would be the application of the current technique to the problem of determining the direction of a closure line when plotting that portion of a graphics area lying outside a given viewing window. Essentially the same technique may be used. An example of such a differing clipping environment is described in European Patent Application No. 91306144.6 entitled "Graphics Clipping" filed on the same day as the present priority application by the present applicant.

Figure 7:
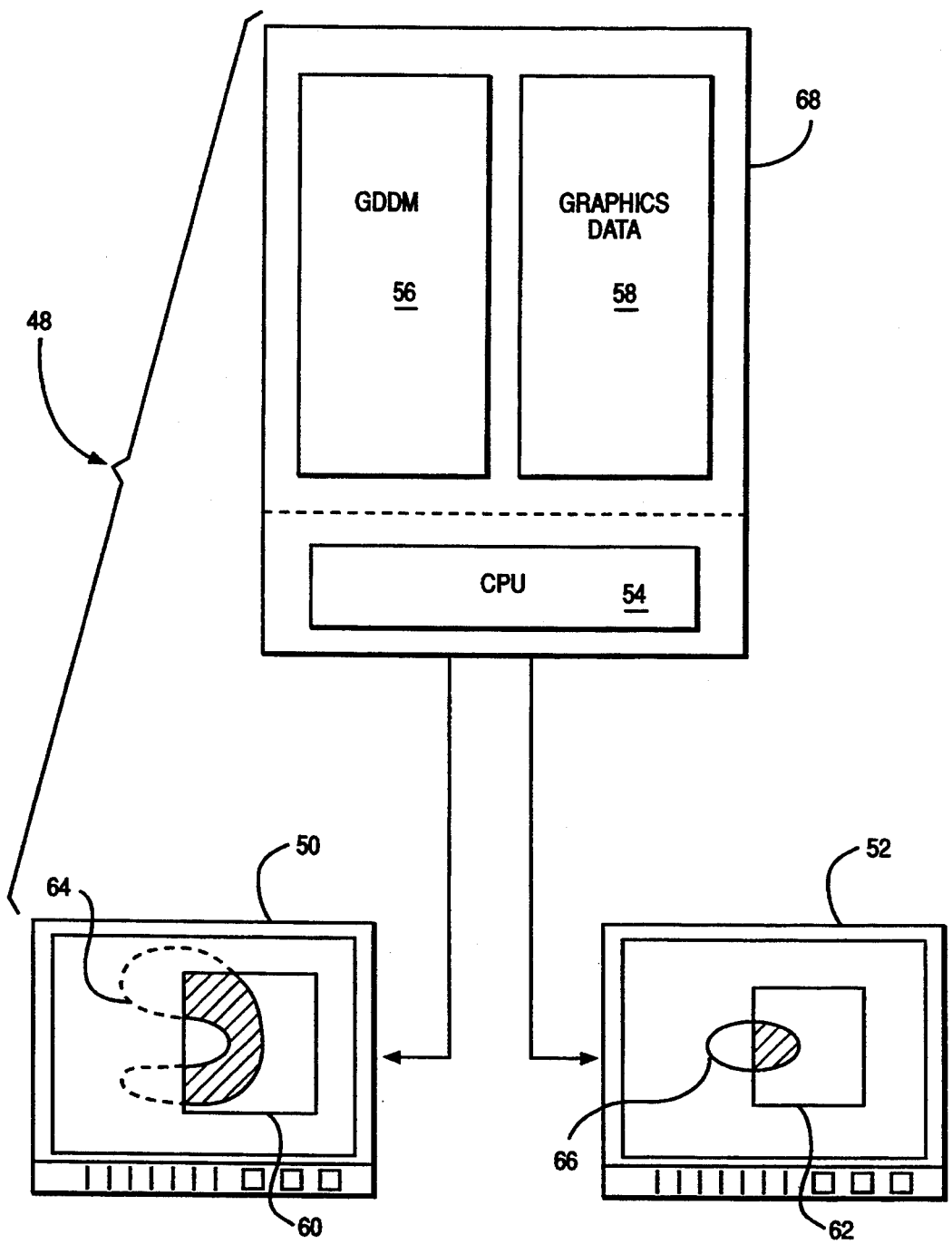
FIG. 7 schematically illustrates typical hardware which may embody the invention.

FIG. 7 schematically illustrates an example of computer system in which the invention may be embodied. The whole of what is shown in FIG. 7 may be termed a graphics processing apparatus 48. This apparatus is composed of a central mainframe computer 68 controlling a number of display devices/terminals 50, 52. The computer 68 includes a central processor unit 54, stored graphics program (GDDM) 56 and stored graphics data (graphics elements composed of lists of vectors) 58 which is to be processed and displayed. The CPU 54 when acting under control of the program 56 serves as clipping logic to carry out the required clipping on the graphics elements 64, 66 to be displayed on the display devices 50, 52. As shown the different graphics elements 64, 66 are clipped by the clipping logic 54, 56 so as to display only those parts visible within the viewing windows 60, 62.

Although the present invention has been fully described above with reference to specific embodiments, other alternate embodiments may be apparent to those of ordinary skill in the art. Therefore, the above description should not be taken as limiting the scope of the present invention which is defined by the appended claims.

I claim:

1. A method of clipping a graphics element having an element border to a viewing window having a window border comprising the steps of:
   a) detecting an exit point where said element border intersects said window border and exits said viewing window and an entry point where said element border intersects said window border and enters said viewing window;
   b) determining a number of times a line extending from a point on said window border crosses said element border outside said viewing window; and
   c) plotting a closure line along said window border between said exit point and said entry point and passing through said point if said line crosses said element border an odd number of times and not passing through said point if said line crosses said element border an even number of times.

2. The method of claim 1 wherein said line is a straight line.

3. The method of claim 2 wherein said point is at a vertex in said window border and said line is an extension of said window border forming said vertex.

4. The method of claim 3 wherein said number of times is determined by checking points around said element border.

5. The method of claim 4 wherein said element border is determined to have crossed said line if said element border extends to and then touches said line or touches and then extends away from said line on a first side of said line and said element border is determined not to have crossed said line if said element border extends to and then touches or touches and then extends away from said line on a second side of said line.

6. The method of claim 5 wherein said closure line is determined to pass through said point if said closure line extends away from said point on said first side of said line and said closure line is determined not to pass through said if said closure line extends away from said point on said second side of said line.

7. The method of claim 6 wherein if said checking starts at a point outside said viewing window then the first entry point is paired with the last exit point, and the number of crossing of said line between said start point end and said entry point is stored and added to the number of crossings of said line between said last exit point and said start point.

8. A graphics processing apparatus for clipping a graphics element having an element border to a viewing window having a window border, said apparatus comprising:
   a) means for detecting an exit point where said element border intersects said window border and exits said viewing window and an entry point where said element border intersects said window border and enters said viewing window;
   b) means for determining a number of times a line extending from a point on said window border crosses said element border outside said viewing window; and
   c) means for plotting a closure line along said window border between said exit point and said entry point and passing through said point if said line crosses said element border an odd number of times and not passing through said point if said line crosses said element border an even number of times.

9. The graphics processing apparatus of claim 8 further comprising means for checking points along said element border to detect entry and exit points.

10. The graphics processing apparatus of claim 9 wherein said means for determining utilizes said point at a vertex in said window border such that said line is an extension of said window border forming said vertex.

11. The graphics processing apparatus of claim 10 wherein said means for determining determines if said checking starts at a point outside said viewing window then the first entry point is paired with the last exit point, and the number of crossing of said line between said start point and said entry point is stored and added to the number of crossings of said line between said last exit point and said start point.

12. A data processing system for clipping a graphics element having an element border to a viewing window having a window border, said apparatus comprising:
   a) a processor for processing data;
   b) a memory coupled to said processor for storing data; and
   c) graphics processing apparatus coupled to said processor including:
      i) means for detecting an exit point where said element border intersects said window border and exits said viewing window and an entry point where said element border intersects said window border and enters said viewing window:
      ii) means for determining a number of times a line extending from a point on said window border crosses said element border outside said viewing window; and
      iii) means for plotting a closure line along said window border between said exit point and said entry point and passing through said point if said line crosses said element border an odd number of times and not passing through said point if said line crosses said element border an even number of times.

13. The data processing apparatus of claim 12 further comprising means for checking points along said element border to detect entry and exit points.

14. The data processing system of claim 13 wherein said means for determining utilizes said point at a vertex in said window border such that said line is an extension of said window border forming said vertex.

15. The data processing system of claim 14 wherein said means for determining determines if said checking starts at a point outside said viewing window then the first entry point is paired with the last exit point, and the number of crossing of said line between said start point and said entry point is stored and added to the number of crossings of said line between said last exit point and said start point.

* * * * *

UNITED STATES PATENT AND TRADEMARK OFFICE
CERTIFICATE OF CORRECTION

PATENT NO. : 5,384,902
DATED : January 24, 1995
INVENTOR(S) : John A. Herrod

It is certified that error appears in the above-identified patent and that said Letters Patent is hereby corrected as shown below:

Col. 1, line 58, delete "ensuring,", insert --ensuring--; and
Col. 8, line 65, after "said", first occurrence, insert
--point--.

Signed and Sealed this

Thirteenth Day of August, 1996

Attest:

BRUCE LEHMAN

*Attesting Officer*   *Commissioner of Patents and Trademarks*